United States Patent [19]

Papina et al.

[11] Patent Number: 5,787,681
[45] Date of Patent: Aug. 4, 1998

[54] SEALING CONDITION MONITORING APPARATUS

[75] Inventors: Jan Papina; Yuzo Otsuka, both of Tokyo, Japan

[73] Assignee: Tetra Laval Holdings & Finance S.A., Switzerland

[21] Appl. No.: 898,852

[22] Filed: Jul. 25, 1997

Related U.S. Application Data

[63] Continuation of Ser. No. 617,892, filed as PCT/JP94/01577 Sep. 26, 1994, abandoned.

[30] Foreign Application Priority Data

Sep. 24, 1993 [JP] Japan .................................. 5-237878

[51] Int. Cl.$^6$ .................................................. B65B 51/10
[52] U.S. Cl. .......................... 53/373.7; 53/550; 53/52; 53/551; 156/358; 156/378
[58] Field of Search ........................ 53/52, 373.7, 550, 53/551, 375.9; 156/358, 367, 378

[56] References Cited

U.S. PATENT DOCUMENTS

| | | | |
|---|---|---|---|
| 3,925,139 | 12/1975 | Simmons | 53/374.8 |
| 4,713,047 | 12/1987 | Klinkel | 156/35.8 |
| 5,051,148 | 9/1991 | Resch | 156/358 |
| 5,252,171 | 10/1993 | Anderson et al. | 156/358 |
| 5,279,098 | 1/1994 | Fukuda | 53/374.6 |
| 5,322,586 | 6/1994 | McLean | 156/358 |
| 5,357,731 | 10/1994 | Conway et al. | 53/374.4 |

FOREIGN PATENT DOCUMENTS

| | | |
|---|---|---|
| 32 14306 | 10/1983 | Germany. |
| 040333 | 2/1992 | Japan. |

OTHER PUBLICATIONS

Patent Abstracts of Japan, vol. 16, No. 216 (P-1356) May 21, 1992.

*Primary Examiner*—James F. Coan
*Assistant Examiner*—Gene L. Kim
*Attorney, Agent, or Firm*—Lorusso & Loud

[57] ABSTRACT

A sealing condition monitoring apparatus detects in a real-time manner a defect in of sealing due to entry of foreign matter or due to a defect or malfunction of components of a sealing apparatus. There are provided a counter bar disposed at the forward end of a counter jaw for sealing a packaging container into which a liquid food is charged, and a sealing bar disposed at the forward end of a heat sealing jaw to face the counter bar. A packaging material is held between the sealing bar and the counter bar, and a pressing force is applied thereto for sealing. A sheet-shaped pressure sensor is provided on the surface of the counter bar for detecting the pressing force applied to the packaging material at each detection point. Also, there is provided a controller which compares data of the pressing force detected by the sheet-shaped pressure sensor and master data which are previously set to correspond to a pressing force for obtaining proper sealing conditions. The controller detects a defect in sealing by comparing the data for detected pressing force with the master data.

10 Claims, 6 Drawing Sheets

5,787,681

SEALING CONDITION MONITORING APPARATUS

This application is a continuation of application Ser. No. 08/617,892, filed as PCT/JP94/01577 Sep. 26, 1994, now abandoned.

TECHNICAL FIELD

The present invention relates to a sealing condition monitoring apparatus.

BACKGROUND ART

In a conventional process for manufacturing a packaging container for liquid foods such as milk and soft drinks, a web-like packaging material, i.e. a flexible laminated material, is supplied to a filling apparatus. In the filling apparatus, the packaging material is formed into a tube, to which liquid food is charged and then cut into a brick-like packaging container.

In more detail, the filling apparatus seals the web-like packaging material in the longitudinal direction to form a tube, and continuously feeds the tube downward. While the tube is fed downward, liquid food is filled into the tube from above. Then, the tube is held at both sides thereof by a sealing/cutting unit and sealed in the lateral or transverse direction of the packaging material at predetermined intervals.

Subsequently, a laterally sealed portion is cut to form a plurality of rectangular containers containing a predetermined amount of liquid food therein, thereby completing the manufacture of packaging containers filled with liquid food.

FIG. 1 is a schematic illustration showing a conventional sealing apparatus. FIG. 1 section (a) is a schematic illustration showing a forming unit. FIG. 1(b) is an illustration showing the engaged state of engaging members, and FIG. 1(c) is an illustration showing the disengaged state of engaging members.

In FIG. 1, the reference numeral 11 denotes a packaging material made of a flexible laminated material and formed into a tube by sealing in the longitudinal direction. The packaging material 11 is laminated, for example, such that lamination layers thereof are in the order of a polyethylene layer serving as a sealant layer, an adhesive layer, an aluminum foil layer, a paper material and a polyethylene layer, from inside to outside, when a packaging container is formed.

The packaging material 11 is continuously transferred downward, and held and sealed in the lateral direction at predetermined intervals by two sealing/cutting units 14 and 15, for forming a strip-like sealing portion S. During this step, liquid food 12 is charged from above into the packaging material 11.

Then, the sealing portion S is cut to form a rectangular container 23 filled with a predetermined amount of the liquid food 12. For these operations, the sealing/cutting units 14 and 15 have, respectively, counter jaws 14a and 15a and heat sealing jaws 14b and 15b.

A counter bar 18 is attached to the forward end of each of the counter jaws 14a and 15a while an inductor 19 serving as a sealing bar is attached to the forward end of each of the heat sealing jaws 14b and 15b. The counter jaws 14a and 15a and the heat sealing jaws 14b and 15b are advanced to hold the packaging material 11 at both sides thereof for bringing the sealant layers of the packaging material 11 into contact with each other and sealing in the lateral direction.

At the center of the counter jaws 14a and 15a, a flat cutter 21 is disposed for free advancing and retracting movement, and cuts the sealing portion S at its center when advanced. For advancing and retracting the cutter 21, a cylinder 22 is attached to the rear end of the cutter 21, and an operating medium is fed to and ejected from the cylinder 22.

The reference numerals 21a and 21b denote a pair of forming flaps for enclosing and guiding the packaging material 11. The forming flaps 21a and 21b are pivotably attached to the counter jaws 14a and 15a and the heat sealing jaws 14b and 15b, respectively, and form the packaging material 11 into a rectangle.

In FIG. 1, the sealing/cutting unit 14 is in the position of starting a sealing/cutting operation, where the counter jaw 14a and the heat sealing jaw 14b are advanced to hold the packaging material 11 at the opposing walls thereof for bringing the sealant layers of the packaging material 11 in contact with each other.

Then, the sealing/cutting unit 14 moves downward while holding the packaging material 11. During this operation, the inductor 19 disposed at the forward end of the heat sealing jaw 14b and the counter bar 18 disposed at the forward end of the counter jaw 14a strongly press the packaging material 11 at the portion to be sealed, and the inductor 19 generates an eddy current in the aluminum foil layer of the packaging material 11, which in turn generates heat, so that the packaging material 11 is laterally sealed for forming the sealing portion S. In this case, the packaging material 11 is sealed by induction heat using the inductor 19. On the other hand, the packaging material 11 may be sealed by Joule heat using a resistor.

In FIG. 1, the sealing/cutting unit 15 is in the position where sealing/cutting operation is completed. Immediately before the sealing/cutting unit 15 reaches this position, the cutter 21 of the sealing/cutting unit 15 advances, and cuts the sealing portion S at its center for separating a rectangular container 23 from the packaging material 11.

After the sealing portion S is cut at its center, the counter jaw 15a and heat sealing jaw 15b of the sealing/cutting unit 15 retract, and then, swing upward to the position for starting sealing/cutting operation. When the sealing/cutting unit 15 reaches the position for starting sealing/cutting operation and begins to move the counter jaw 15a and the heat sealing jaw 15b, the cutter 21 of the sealing/cutting unit 14 advances to cut the sealing portion S at its center for separating the rectangular container 23 from the packaging material 11.

Reference numerals 25 and 26 denote a pair of engaging hooks which form an engaging member. The engaging hook 25 is attached to each of the counter jaws 14a and 15a while the engaging hook 26 is attached to each of the heat sealing jaws 14b and 15b. A cylinder 27 is connected to the engaging hook 26.

After the engaging hooks 25 and 26 are engaged with each other, an operating medium is supplied to the cylinder 27 for drawing the counter jaw 14a and the heat sealing jaw 14b toward each other, thereby increasing the pressing force for sealing. In the position of starting the sealing/cutting operation, the engaging hooks 25 and 26 are engaged with each other as shown in FIG. 1(b) while in the position of completing the sealing/cutting operation, the engaging hooks 25 and 26 are disengaged from each other as shown in FIG. 1(c).

In the above-described conventional sealing apparatus, sealing may be defective due to a foreign matter which enters between the counter bar 18 and the packaging material 11 or between the inductor 19 and the packaging

3 material 11, or due to defectiveness or malfunction which occurs in components of the sealing apparatus, such as the counter bar 18, the inductor 19, the cylinders 22 and 27, and the engaging hooks 25 and 26. However, in the conventional sealing apparatus, such a defective sealing cannot be detected in a real-time manner.

An object of the present invention is to solve the above-mentioned problems of the conventional sealing apparatus, and to provide a sealing condition monitoring apparatus which can detect in a real-time manner a defective sealing due to entry of foreign matter, or defectiveness or malfunction of the components of the sealing apparatus.

DISCLOSURE OF THE INVENTION

To achieve the object, a sealing condition monitoring apparatus according to the present invention comprises a counter jaw, a heat sealing jaw arranged to face the counter jaw, and a drive mechanism for relatively advancing and retracting the counter jaw and the heat sealing jaw.

Also, there are provided a counter bar disposed at the forward end of the counter jaw, a sealing bar disposed at the forward end of the heat sealing jaw to face the counter bar for holding a packaging material between the sealing bar and the counter bar and applying a pressing force to the packaging material for sealing, and a sheet-shaped pressure sensor provided on the surface of the counter bar for detecting the pressing force applied to the packaging material at each of detection points.

Accordingly, when the counter jaw and the heat sealing jaw are relatively advanced by operating the drive mechanism, the packaging material is held by the counter bar and the sealing bar. Subsequently, while the packaging material is held, a pressing force is applied to the packaging material by the sealing bar, whereby the packaging material being sealed.

Also, there is provided a controller which has means for comparing data representing the pressing force detected by the sheet-shaped pressure sensor and master data which are previously set to correspond to a pressing force for obtaining proper sealing conditions.

Accordingly, in the case, for example, where a foreign matter enters between the counter bar and the heat sealing bar, the controller can detect sealing defects by comparing the data of detected pressing force and the master data.

If various portions of the sealing apparatus are worn away due to deterioration over years, the drive mechanism is adjusted. Accordingly, it is possible to stabilize the pressing force applied to the packaging material and to make the overall pressing force applied by the counter bar and the sealing bar uniform.

As a result, defective sealing is prevented, and each packaging container is uniformly sealed.

In another sealing condition monitoring apparatus according to the present invention, the sheet-shaped pressure sensor separately detects the pressing force at each set of coordinates corresponding to detection points. Accordingly, in the event that a foreign matter enters between the counter bar and the sealing bar, the location of the foreign matter can easily be detected.

In still another sealing condition monitoring apparatus according to the present invention, the controller controls the drive mechanism based on the results of comparison between data of the detected pressing force and the master data.

Accordingly, when a foreign matter enters between the counter bar and the sealing bar and the pressing force exceeds a predetermined threshold value, the controller controls the drive mechanism to stop the sealing apparatus. As a result, the counter bar and the sealing bar are prevented from being damaged.

BEST MODE FOR CARRYING OUT THE INVENTION

An embodiment of the present invention will next be described in detail with reference to the drawings.

Figure 2:
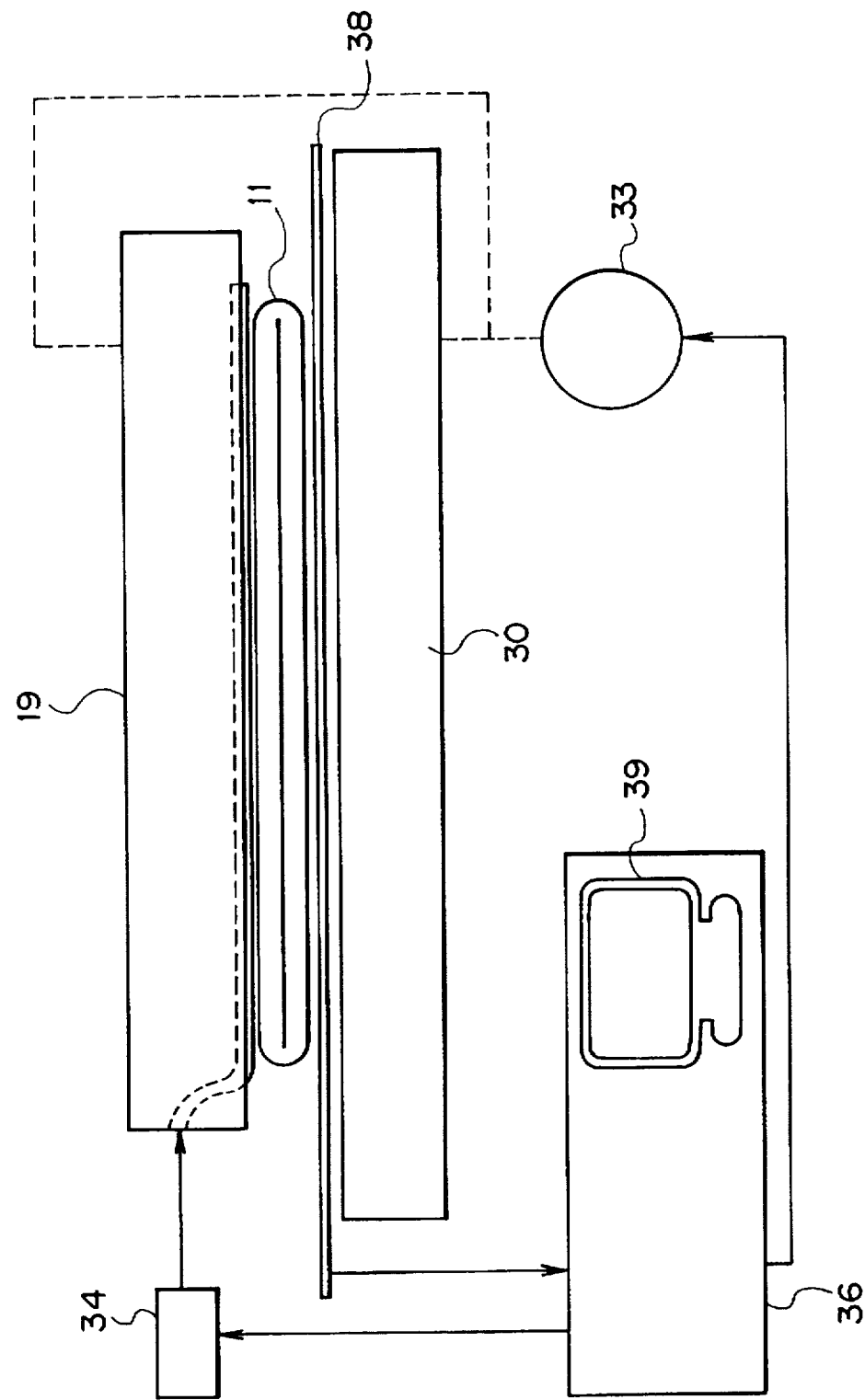
FIG. 2 is a schematic illustration of a sealing condition monitoring apparatus showing an embodiment of the present invention.
Figure 3:
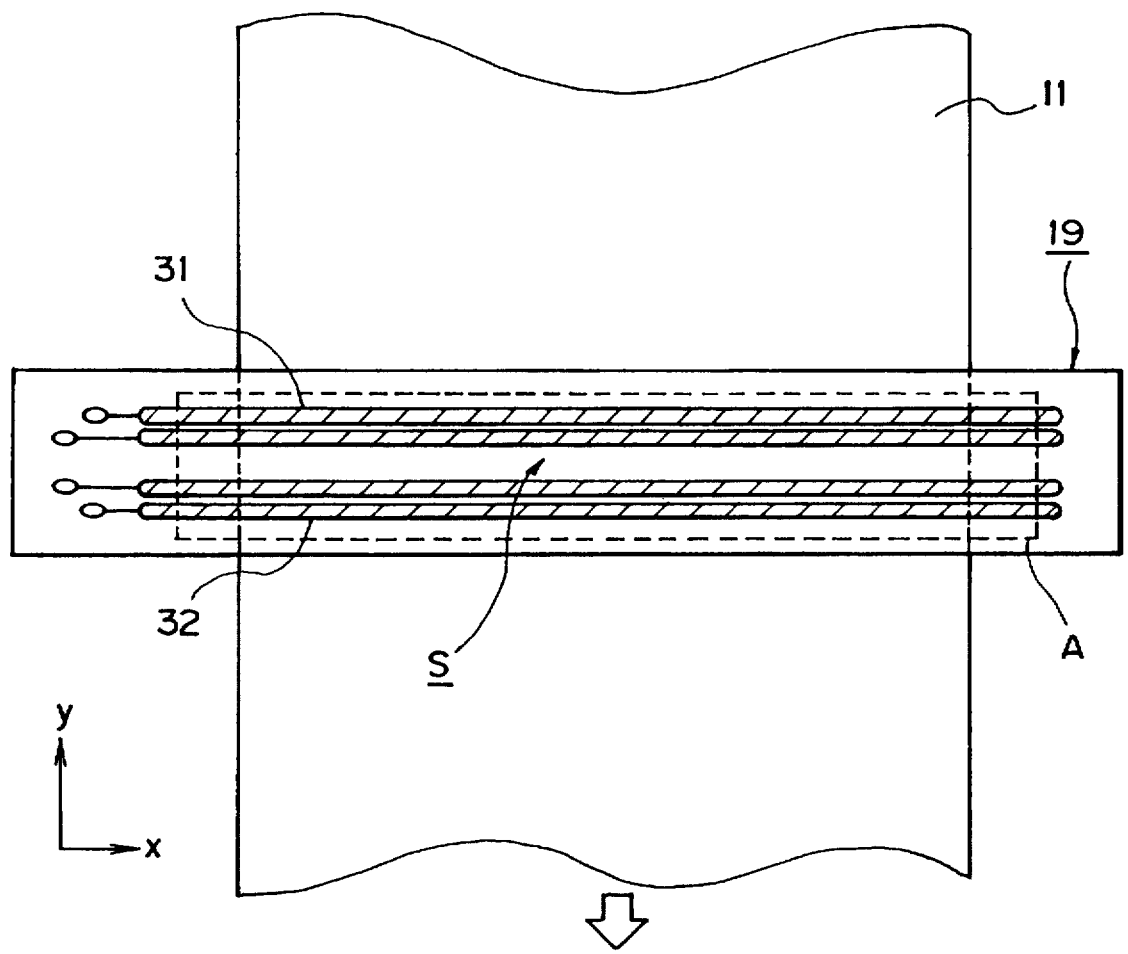
FIG. 3 is a view showing the installed state of an inductor.

FIG. 2 is a schematic illustration of a sealing condition monitoring apparatus showing an embodiment of the present invention, and FIG. 3 is a view showing the installed state of an inductor.

Figure 1:
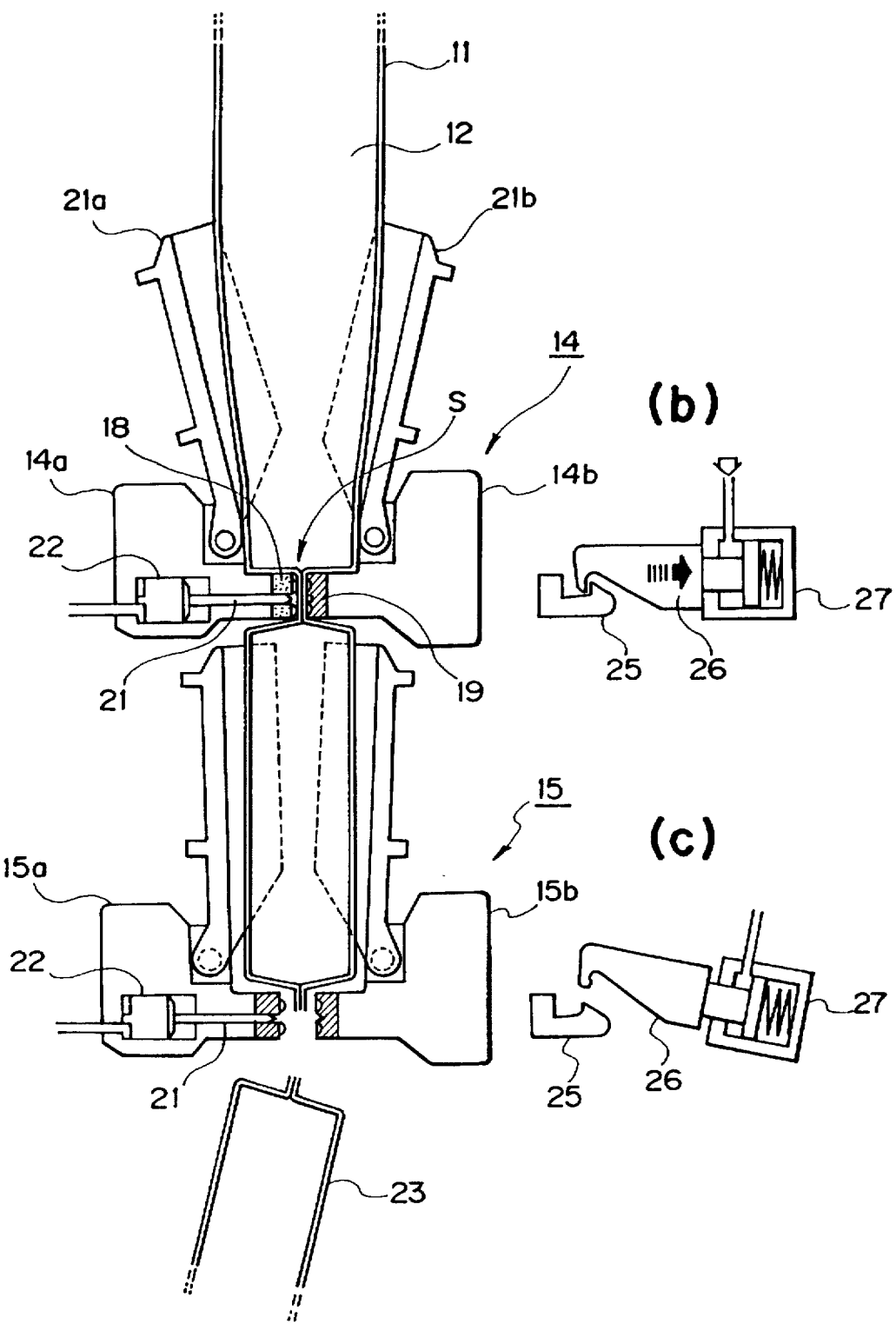
FIG. 1 is a schematic illustration showing a conventional sealing apparatus, wherein section (a) is a schematic illustration showing a forming unit, section (b) is an illustration showing the engaged state of engaging members, and section (c) is an illustration showing the disengaged state of engaging members.

In these drawings, reference numeral 11 denotes a packaging material, which is laminated, for example, such that lamination layers thereof are in the order of a polyethylene layer serving as a sealant layer, a paper material, an adhesive layer, an aluminum foil layer, another adhesive layer and a polyethylene layer, from inside to outside when a packaging container 23 (see FIG. 1) is formed.

Reference numeral 30 denotes a counter bar which is made of steel and is disposed at the forward end of each of the counter jaws 14a and 15a, and reference numeral 19 denotes an inductor serving as a sealing bar which is disposed at the forward end of each of the heat sealing jaws 14b and 15b to face the counter bar 30. The inductor 19 has first and second induction heating bodies 31 and 32. The first induction heating body 31 seals the bottom portion of a packaging container 23 adjacent thereto, while the second induction heating body 32 seals the top portion of another packaging container 23 adjacent thereto.

Each of the counter jaws 14a and 15a and the heat sealing jaws 14b and 15b are connected to a drive mechanism 33, which advances and retracts the counter jaws 14a and 15a and the heat sealing jaws 14b and 15b relative to each other. By an advancing movement, they hold the packaging material 11 at the both sides thereof and apply a pressing force thereto so that facing portions of the sealant layers contact with each other.

A power supply circuit 34 is provided for supplying the first and second induction heating bodies 31 and 32 with a high-frequency voltage during the above-described operations. When the high-frequency voltage is applied to the first and second induction heating bodies 31 and 32, an eddy current flows in the aluminum foil layer of the packaging material 11 due to induction so that heat is generated in the aluminum foil layer due to an eddy current loss. As a result, portions of the sealant layers corresponding to the sealing area S are adhere together. In the present invention, a rectangular packaging container 23 is formed from the packaging material 11 having a tubular shape. However, the present invention may be applied to formation of other types of packaging containers such as a gable-top type packaging containers.

The power supply circuit 34 is connected to a controller 36. At a predetermined timing, the controller 36 applies the high-frequency voltage to the first and second induction heating bodies 31 and 32 and controls the value of the voltage.

A sheet-shaped pressure sensor 38 is disposed on the surface of the counter bar 30 (see FIG. 2). The sheet-shaped pressure sensor 38 detects pressing force applied to the packaging material 11 in a detection area A corresponding to the sealing area S (see FIG. 3). Moreover, the sheet-shaped pressure sensor 38 separately detects the pressing force $P(x,y)$ at each set of coordinates $(x,y)$ of very small detection points in the detection area A.

In this case, data of the detected pressing force $P(x,y)$ are transmitted to the controller 36. In the controller 36, master data are stored as a master pattern. The master data are previously set to correspond to a pressing force $P(x,y)$ for obtaining proper sealing conditions. The received data of the pressing force $P(x,y)$ are compared with the master data. When the difference between them is considerably large, alarm sound is generated or the sealing apparatus is stopped. The data pattern of the pressing force $P(x,y)$ and the master pattern are continuously displayed on a display 39 for monitoring. In this case, since the sheet-shaped pressure sensor 38 separately detects the pressing force $P(x,y)$ at each set of coordinates $(x,y)$ of the very small detection points in the detection area A, the location of a foreign matter which has entered between the counter bar 39 and the inductor 19 can be easily detected.

Since the data of the pressing force $P(x,y)$ detected by the sheet-shaped pressure sensor 38 are sent to the controller 36, the controller 36 can also monitor other modules of the filling apparatus, such as a drive unit, a punch unit, a pull-tab sealing apparatus, a bending roller, and a charging unit, thereby providing total control of the filling apparatus.

In the case where a similar monitoring apparatus is provided for each of the other modules, a pattern for monitoring the status of each module and a master pattern representing the normal operation of each module may be displayed on the display 39. Further, it is possible to carry out maintenance and control after the filling apparatus has been operated for a long period of time, as well as to monitor the filling apparatus.

Figure 4:
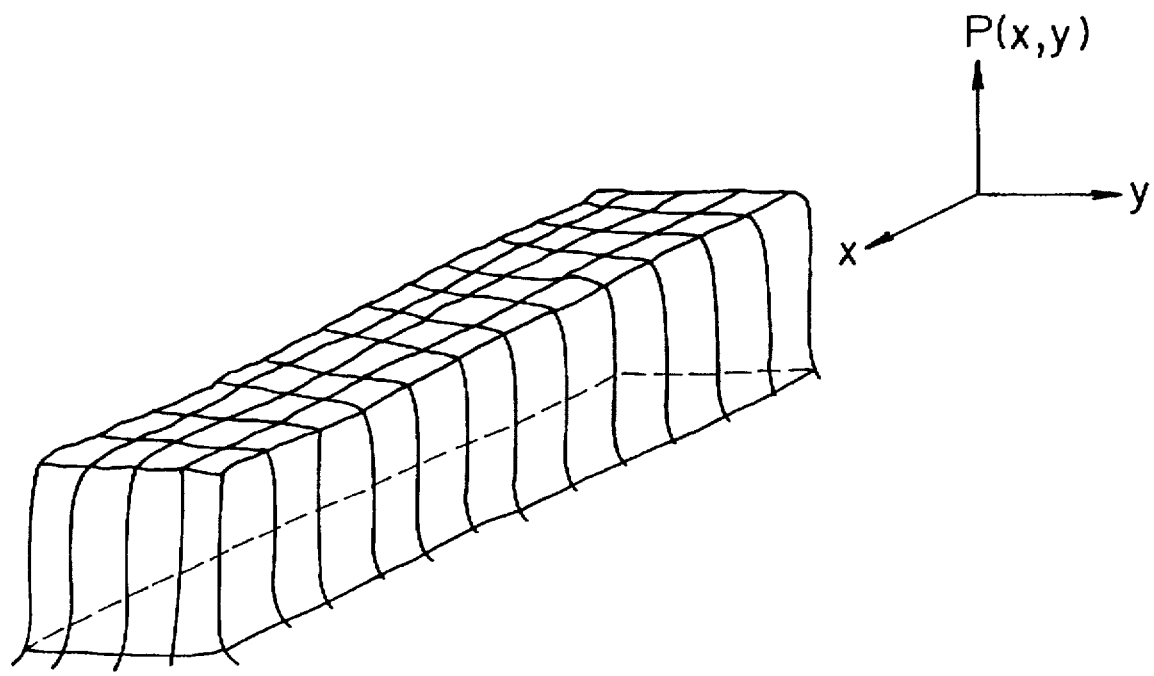
FIG. 4 is a chart showing a master pattern used in the sealing condition monitoring apparatus according to the embodiment of the present invention.
Figure 5:
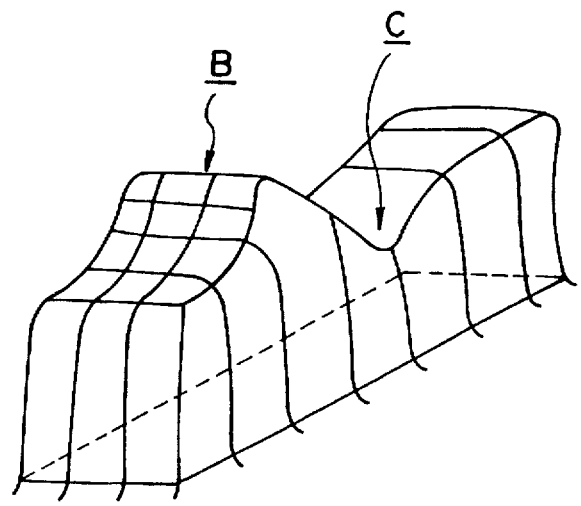
FIG. 5 is a chart showing a first example of a display of the sealing condition monitoring apparatus according to the embodiment of the present invention.
Figure 6:
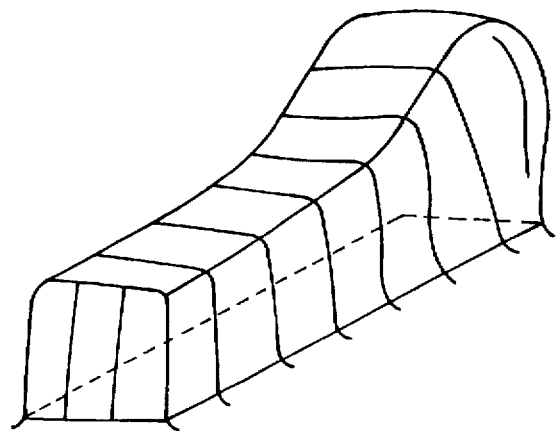
FIG. 6 is a chart showing a second example of a display of the sealing condition monitoring apparatus according to the embodiment of the present invention.

FIG. 4 is a chart showing a master pattern used in the sealing condition monitoring apparatus according to the embodiment of the present invention, FIG. 5 is a chart showing a first example of a display of the sealing condition monitoring apparatus according to the embodiment of the present invention, and FIG. 6 is a chart showing a second example of a display of the sealing condition monitoring apparatus according to the embodiment of the present invention.

As shown in these drawings, pressing force $P(x,y)$ is displayed as a three-dimensional shape on the display 39 (FIG. 2) for each set of the coordinates $(x,y)$ of the detection points. FIG. 4 shows a master pattern in which the pressing force $P(x,y)$ applied to the packaging material 11 is uniform. FIG. 5 shows the case where a foreign matter enters between the counter bar 30 and the inductor 19. Assuming that a foreign matter exists in an area B having coordinates $(x,y_1)$, the pressing force $P(x,y_1)$ at the coordinates $(x,y_1)$ increases, while the pressing force $P(x,y_2)$ in an adjacent area C at the coordinates $(x,y_2)$ decreases.

FIG. 6 shows the case where the parallelism of the counter bar 30 or the inductor 19 is lost because the various portions of the sealing apparatus have been worn over the years. In this case, the pressing force $P(x,y)$ applied to the packaging material 11 varies for each sealing operation, or the overall pressing force $P(x,y)$ of the counter bar 30 and the inductor 19 cannot be made uniform. Accordingly, the packaging material 11 cannot be uniformly sealed.

Next, the structure of the sheet-shaped pressure sensor 38 will be described.

Figure 7:
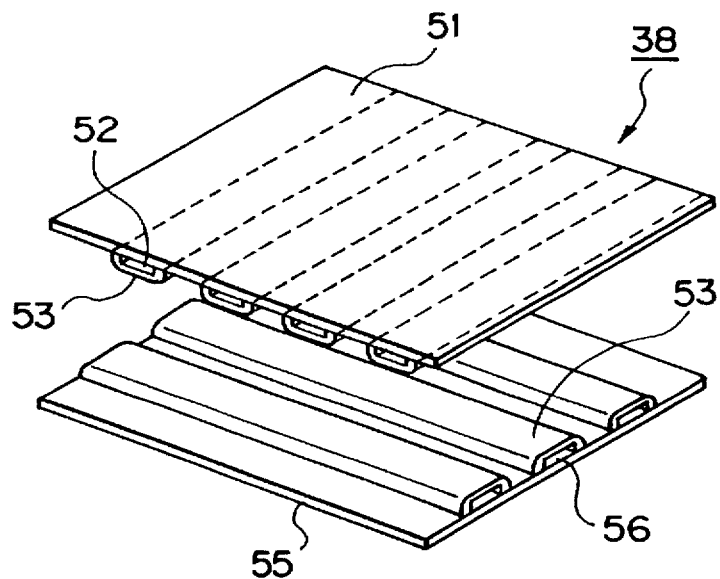
FIG. 7 is a perspective view of a main portion of a sheet-shaped pressure sensor used in the embodiment of the present invention.
Figure 8:
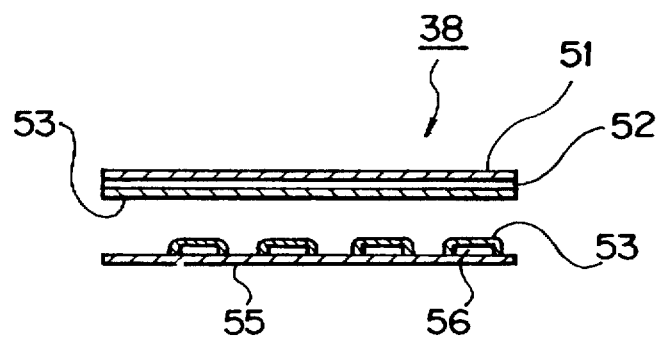
FIG. 8 is a sectional view of the main portion of the sheet-shaped pressure sensor used in the embodiment of the present invention.

FIG. 7 is a perspective view of a main portion of a sheet-shaped pressure sensor used in the embodiment of the present invention, and FIG. 8 is a sectional view of the main portion of the sheet-shaped pressure sensor used in the embodiment of the present invention.

In these drawings, reference numeral 38 denotes a sheet-shaped pressure sensor, reference numeral 51 denotes a row electrode packing seat made of a polyester film or the like. A plurality of row electrodes 52 having a narrow width are formed in parallel on the row electrode packing seat 51. The row electrodes 52 are arranged in the detection area A (FIG. 3) at predetermined intervals along the y-axis, and are coated with a pressure detection ink 53.

Reference numeral 55 denotes a column electrode packing seat made of a polyester film or the like. A plurality of column electrodes 56 having a narrow width are formed in parallel on the column electrode packing seat 55. The column electrodes 56 are arranged in the detection area A at predetermined intervals along the x-axis, and are coated with a pressure detection ink 53.

The present invention is not limited to the above-mentioned embodiment. Numerous modifications and variations of the present invention are possible in light of the spirit of the present invention, and they are not excluded from the scope of the present invention.

We claim:

1. A sealing condition monitoring apparatus comprising:
   (a) a counter jaw;
   (b) a heat sealing jaw arranged to face said counter jaw;
   (c) a drive mechanism for advancing and retracting said counter jaw and said heat sealing jaw relative to each other;
   (d) a counter bar disposed at a forward end of said counter jaw;
   (e) a sealing bar disposed at a forward end of said heat sealing jaw and presenting a sealing surface facing said counter bar for holding a packaging material between said sealing bar and said counter bar and applying heat and a pressing force to said packaging material for sealing an area of said packaging material coextensive with said sealing surface; and (f) pressure sensing means, in the form of a sheet-shaped pressure sensor coextensive with said sealing surface and with the area of the packaging material receiving the applied pressing force, for detecting the pressing forces applied to said packaging material at different detection points within the area of the packaging material receiving the applied pressing force.

2. A sealing condition monitoring apparatus according to claim 1, wherein said sheet-shaped pressure sensor separately detects the pressing force at each set of coordinates defining a detection point within a two-dimensional array of plural detection points spanning the area of the packaging material receiving the applied pressing force.

3. A sealing condition monitoring apparatus according to claim 1, further comprising a controller, said controller comprising means for comparing data representing the pressing forces detected by said sheet-shaped pressure sensor and master data predetermined to correspond to pressing forces for obtaining proper sealing conditions, and means for controlling said drive mechanism based on results of the comparison between the data representing the detected pressing forces and the master data.

4. A sealing condition monitoring apparatus according to claim 2, further comprising a controller, said controller comprising means for comparing data representing the pressing forces detected by said sheet-shaped pressure sensor and master data predetermined to correspond to pressing forces for obtaining proper sealing conditions, and means for controlling said drive mechanism based on results of the comparison between the data representing the detected pressing forces and the master data.

5. A sealing condition monitoring apparatus according to claim 2 wherein said sheet-shaped pressure sensor consists of a first array of linear, parallel electrodes and a second array of linear parallel electrodes crossing the electrodes of said first array, said plural pressure detection points being formed where electrodes of said first array cross electrodes of said second array.

6. A sealing condition monitoring apparatus according to claim 4 wherein said sheet-shaped pressure sensor consists of a first array of linear, parallel electrodes and a second array of linear parallel electrodes crossing the electrodes of said first array, said plural pressure detection points being formed where electrodes of said first array cross electrodes of said second array.

7. A sealing condition monitoring apparatus according to claim 2, further comprising means for generating a display of a three-dimensional pressure profile based on the pressing forces detected at said plural detection points.

8. A sealing condition monitoring apparatus according to claim 4, further comprising means for generating a display of a three-dimensional pressure profile based on the pressing forces detected at said plural detection points.

9. A sealing condition monitoring apparatus according to claim 5, further comprising means for generating a display of a three-dimensional pressure profile based on the pressing forces detected at said plural detection points.

10. A sealing condition monitoring apparatus according to claim 6, further comprising means for generating a display of a three-dimensional pressure profile based on the pressing forces detected at said plural detection points.

* * * * *